United States Patent
Hsueh et al.

(10) Patent No.: US 8,959,620 B2
(45) Date of Patent: Feb. 17, 2015

(54) SYSTEM AND METHOD FOR COMPOSING AN AUTHENTICATION PASSWORD ASSOCIATED WITH AN ELECTRONIC DEVICE

(71) Applicant: Mitac International Corp., Taoyuan County (TW)

(72) Inventors: Ching-Teng Hsueh, Taoyuan County (TW); Hui-Chun Yang, Taoyuan County (TW)

(73) Assignee: Mitac International Corp., Taoyuan County (TW)

( * ) Notice: Subject to any disclaimer, the term of this patent is extended or adjusted under 35 U.S.C. 154(b) by 77 days.

(21) Appl. No.: 13/828,205

(22) Filed: Mar. 14, 2013

(65) Prior Publication Data
US 2014/0283009 A1    Sep. 18, 2014

(51) Int. Cl.
*G06F 21/46*    (2013.01)
*G06F 3/0488*    (2013.01)

(52) U.S. Cl.
CPC .............. *G06F 21/46* (2013.01); *G06F 3/0488* (2013.01)
USPC ........ 726/18; 726/2; 726/16; 726/17; 726/19; 726/26; 713/161; 713/182; 713/183; 713/185; 713/186; 380/247; 380/248; 380/249; 380/250; 380/258

(58) Field of Classification Search
USPC .................. 726/2, 16–18, 21, 26–27, 34–35; 713/161, 182–186; 380/247–250, 258
See application file for complete search history.

(56) References Cited

U.S. PATENT DOCUMENTS

| | | | | |
|---|---|---|---|---|
| 8,743,076 | B1* | 6/2014 | Ludwig | 345/173 |
| 2010/0262591 | A1* | 10/2010 | Lee et al. | 707/706 |
| 2011/0248916 | A1* | 10/2011 | Griffin et al. | 345/157 |
| 2011/0316797 | A1 | 12/2011 | Johansson | |
| 2012/0133484 | A1* | 5/2012 | Griffin | 340/5.54 |
| 2012/0159583 | A1* | 6/2012 | Griffin et al. | 726/5 |

FOREIGN PATENT DOCUMENTS

| | | |
|---|---|---|
| TW | 201137658 A1 | 11/2011 |
| TW | M424546 U1 | 3/2012 |
| TW | 201227460 A1 | 7/2012 |

OTHER PUBLICATIONS

The Seach Report appended in an Office Acton issued to Taiwanese Counterpart Applicton No. 101123880 by the Taiwan intellectual Property Office on Oct. 8, 2014 along with an English translation thereof.

* cited by examiner

*Primary Examiner* — Venkat Perungavoor
*Assistant Examiner* — Amir Mehrmanesh
(74) *Attorney, Agent, or Firm* — Vedder Price PC

(57) ABSTRACT

A method for composing an authentication password associated with an electronic device is implemented by a password composing system including a display, a receiving unit, and a processing unit. In the method, the display is configured to display a start point, and a plurality of displayed paths. The receiving unit is configured to detect a set of user-input movements of a contact point at the display. The processing unit is configured to determine whether the user-input movements conform with a predefined valid user-input gesture, store a plurality of codes corresponding to the valid user-input gestures, and to compose the authentication password according to valid ones of the series of the user-input movements.

18 Claims, 5 Drawing Sheets

SYSTEM AND METHOD FOR COMPOSING AN AUTHENTICATION PASSWORD ASSOCIATED WITH AN ELECTRONIC DEVICE

BACKGROUND OF THE INVENTION

1. Field of the Invention

The invention relates to a method and system for composing an authentication password associated with an electronic device such as cell phones, personal digital assistants, laptop and/or notebook, PND, PAD and the like.

2. Description of the Related Art

A portable electronic device (e.g., a cellphone) is typically implemented with a lock/unlock mechanism associated with an input interface (e.g., a touch screen, a keypad, etc.) thereof. When the electronic device is locked, the input interface is disabled, preventing unintentional and/or unauthorized access to the electronic device via the input interface. In order to unlock and gain access to the electronic device, an authentication password that is assigned by a user of the electronic device is required to be inputted.

There are a number of conventional lock/unlock mechanisms associated with various portable electronic devices. For example, regarding one conventional lock/unlock mechanism for a Nokia phone having a keypad, a specific set of keys have to be pressed to unlock the phone. Another conventional lock/unlock mechanism for an electronic device using iOS developed by Apple Inc., commonly known as a "slide to unlock" mechanism, is implemented in such devices. Still another conventional lock/unlock mechanism for executing an action directed to an electronic device using Android operating system having a locked screen is commonly known as a "nine-point unlock" mechanism.

However, the conventional lock/unlock mechanisms described above may have some drawbacks. For example, the "slide to unlock" mechanism involves only a predetermined sliding gesture, and is not capable of preventing from unauthorized access to the iOS device since anyone can perform the sliding gesture. In some examples, an additional four-digit numerical password set can be implemented such that after the sliding gesture is made, the numerical password set must be inputted as well.

SUMMARY OF THE INVENTION

Therefore, the object of the present invention is to provide a method for composing an authentication password.

Accordingly, a method for composing an authentication password associated with an electronic device is to be implemented by a password composing system. The password composing system is coupled to the electronic device and includes a display, a receiving unit, and a processing unit. The method comprises the following steps of:

(a) configuring the display of the password composing system to display a start point, and a plurality of displayed paths respectively extending from the start point toward different directions and terminating at respective end points;

(b) configuring the receiving unit of the password composing system to detect a user-input movement of a contact point at the display, and configuring the processing unit of the password composing system to determine whether the user-input movement of the contact point conforms with a predefined valid user-input gesture, wherein the predefined valid user-input gesture includes a sliding motion along one of the displayed path from the start point to a corresponding one of the end points;

(c) when it is determined in step (b) that the user-input movement conforms with the predefined valid user-input gesture, configuring the processing unit to store a code corresponding to the user-input movement; and (d) configuring the password composing system to repeat steps (b) and (c) to compose an authentication password by collecting the codes, which are stored in step (c), together.

Another object of the present invention is to provide a password composing system that is capable of implementing the abovementioned method.

Accordingly, a password composing system is to be coupled to an electronic device for composing an authentication password associated with the electronic device. The password composing system comprises a display, a receiving unit and a processing unit.

The display is for displaying a start point, and a plurality of displayed paths respectively extending from the start point toward different directions and terminating at respective end points.

The receiving unit is for detecting a set of user-input movements of a contact point at the display.

The processing unit is coupled to the display and the receiving unit, and is configured to:

determine whether each of the user-input movements of the contact point conforms with a predefined valid user-input gesture that includes a sliding motion along one of the displayed path from the start point to a corresponding one of the end points;

store a plurality of codes corresponding to valid ones of the user-input movements that conforms with the predefined valid user-input gesture, respectively; and compose the authentication password by collecting the codes.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
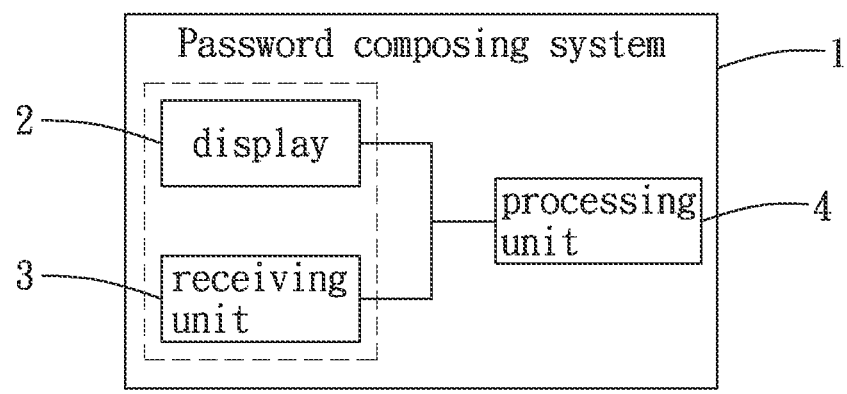
FIG. 1 is a schematic block diagram of a password composing system according to a preferred embodiment of the invention.

As shown in FIG. 1, according to the preferred embodiment of the present invention, a method for composing an authentication password associated with an electronic device (not shown) is executed by a password composing system 1 coupled to the electronic device. The password composing system 1 comprises a display 2, a receiving unit 3 and a processing unit 4. In this embodiment, the electronic device is a cellphone, and the display 2 and the receiving unit 3 are implemented integrally in a touch screen. It is noted that other types of the electronic devices and other configurations of the password composing system 1 can be present in other embodiments of the invention. For example, the receiving unit 3 can be a pointing device (e.g., a mouse, a joy stick, and the like) separate from the display 2 and having a press button.

Figure 2:
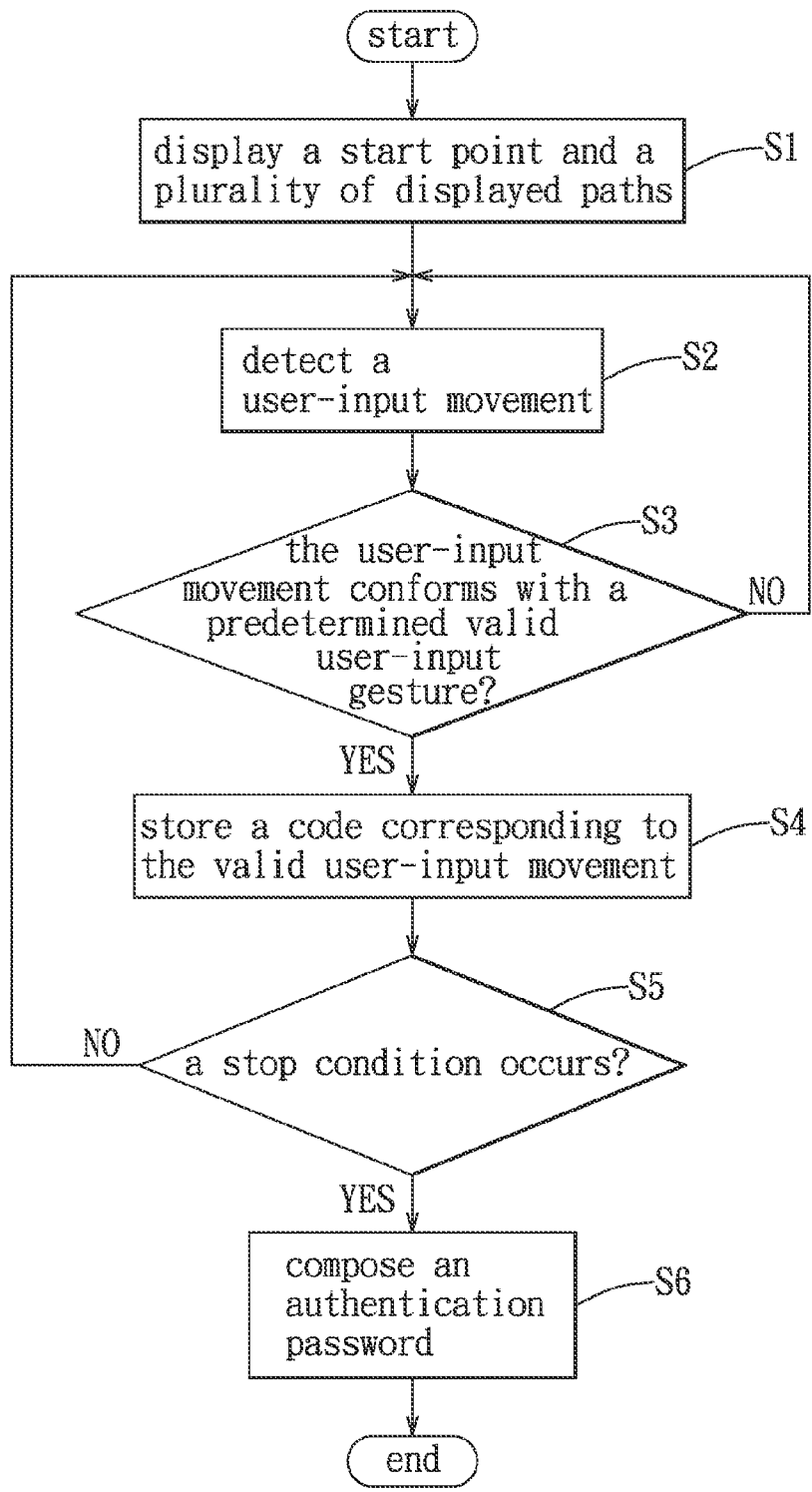
FIG. 2 is a flow chart illustrating steps of a method performed by the password composing system for composing an authentication password in a setting/resetting procedure.
Figure 3:
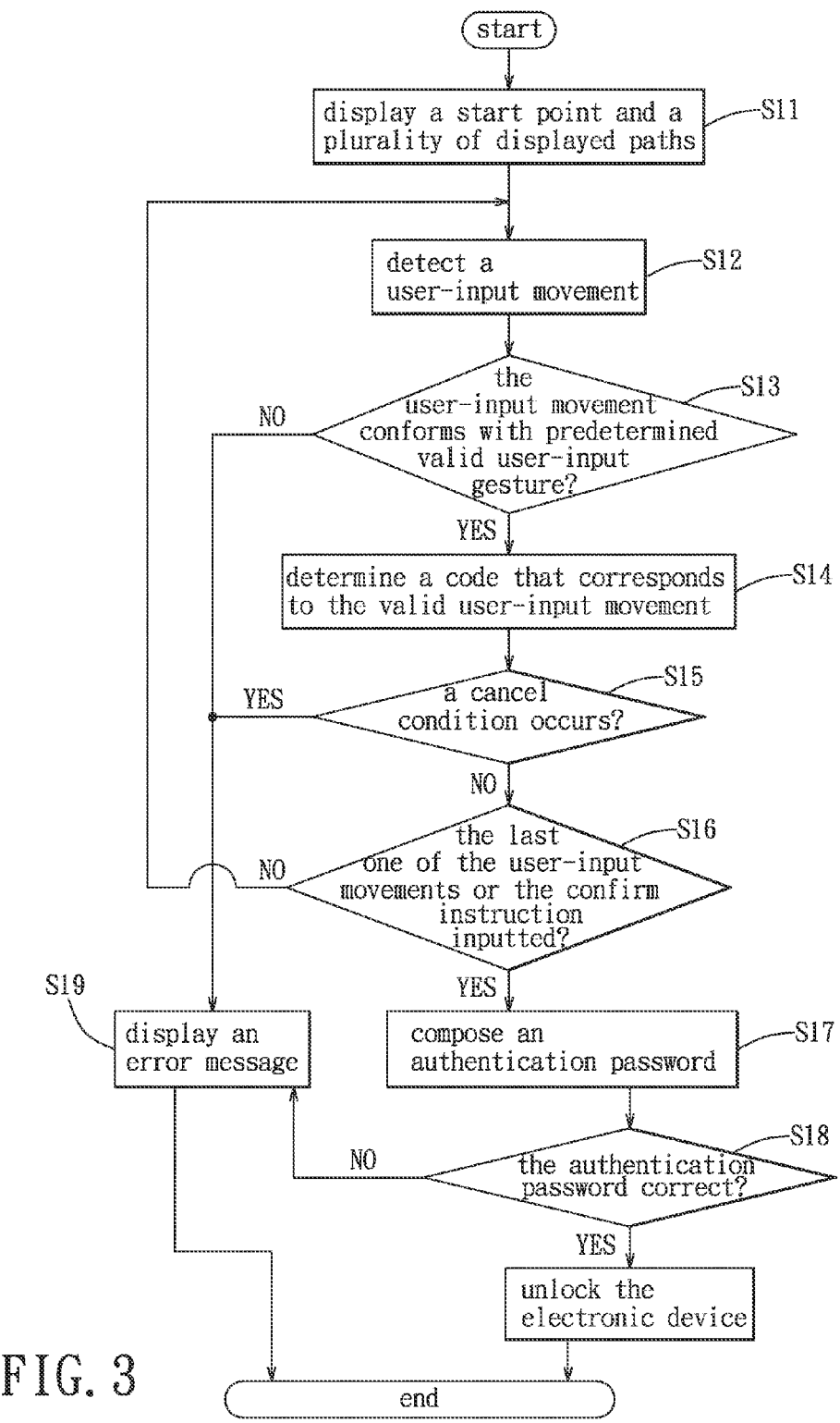
FIG. 3 is a flow chart illustrating steps of the method performed by the password composing system for composing the authentication password in an unlocking procedure.

FIGS. 2 and 3 illustrate steps of the method for composing the authentication password according to the preferred embodiment. It is noted that, the method can be applied to a password setting/resetting procedure (FIG. 2), in which the method is to set/reset the authentication password associated with the electronic device, and to an unlocking procedure (FIG. 3), in which the electronic device is password-protected and the authentication password composed by the method is inputted in order to unlock the electronic device.

Referring to FIG. 2, the password composing system 1 is operable to execute the method for composing an authentication password in the setting/resetting procedure including the following steps.

In step S1, the display 2 of the password composing system 1 is operable to display a start point, and a plurality of displayed paths respectively extending from the start point toward different directions and terminating at respective end points.

Figure 4:
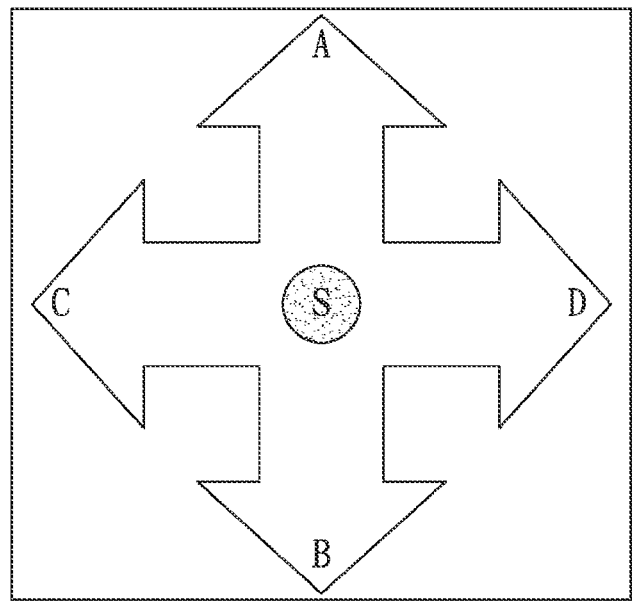
FIG. 4 is a schematic view illustrating an exemplary password input interface that can be displayed by the password composing system for composing an authentication password.

In the illustrative example shown in FIG. 4, a password setting interface displayed by the display 2, in which a start point (S), four displayed paths and respective end points (A, B, C and D) are present. In other examples, various numbers of displayed paths can be present and can be arranged in a different manner.

Then, in step S2, the receiving unit 3 is operable to detect a user-input movement of a contact point at the display 2. In other words, a user of the electronic device is instructed to input the user-input movement through the receiving unit 3.

Once user-input movement is detected by the receiving unit 3, the processing unit 4 is operable, in step S3, to determine whether the user-input movement conforms with a predefined valid user-input gesture along one of the displayed paths from the start point (S) to a corresponding one of the end points (A-D).

For example, the user-input movement is a gesture made with a user finger or a stylus pen to control a virtual pointer on the touch screen. In order to execute an user-input movement that matches one of predefined valid user-input gestures, the user has to start the user-input movement at the start point (S) on the display 2, to hold and move the virtual pointer toward one of the end points (A-D) along the corresponding displayed path, and to stop the user-input movement at one of the end points on the display 2 (i.e., to depart the user finger or the stylus pen from the display 2). Thus, the user-input movement that matches one of the predefined gestures is defined as a predefined valid user-input gesture.

It is noted that, while in this embodiment the user-input movement is executed by touching the touch screen (with the finger or the stylus pen), in other embodiments where the receiving unit 3 is a pointing device, the user-input movement can be triggered by pressing the press button to move the corresponding pointer (e.g., a mouse cursor, a joy stick, and the like) from the start point (S) of the display 2. As a result, a user-input movement is made by dragging the pointer in a similar manner to one of the end points (A-D) along the corresponding displayed path while pressing and holding the press button, and then releasing the press button to complete the user-input movement (i.e., terminating the user-input movement).

When it is determined, in step S3, that the user-input movement conforms with the predefined valid user-input gesture, the processing unit 4 defines the user-input movement that matches one of the predefined gestures as a predefined valid user-input gesture and then the flow goes to the step S4. Otherwise, the flow goes back to step S2 to continue detecting another user-input movement of a contact point at the display 2. In Step S4, a code that corresponds to the predefined valid user-input gesture is stored in order by the processing unit 4, and then the flow proceeds to step S5.

In step S5, the processing unit 4 is operable to determine whether a stop condition occurs. The stop condition implies that a series of user-input movements have been inputted. In this embodiment, occurrence of the stop condition is determined when the receiving unit 3 receives a stop instruction (such as a "setting complete" instruction), or when the receiving unit has been idle for a period of time. When such determination is affirmative, the flow proceeds to step S6. Otherwise, the flow goes back to step S2 to detect another user-input movement of a contact point at the display 2.

In step S6, the processing unit 4 is operable to compose the authentication password according to the valid user-input gestures. Specifically, the processing unit 4 is operable to collect the codes that are stored in order within step S4 to compose the authentication password.

For example, assume that a series of three user-input movements are received and determined as valid user-input gestures in steps S2 and S3, and that the three user-input movements terminate at the end points (A), (B), and (B), respectively. In this case, each time a user-input movement is detected by the receiving unit 3, the processing unit 4 stores a corresponding code (i.e., (A), (B), and (B)) in step S4. Then in step S6, the codes are strung together to compose the authentication password as (ABB) and to store the authentication password. In some examples, the authentication password can be composed as (A1B2).

It is noted that, a code is stored only when the user completes a valid user-input gesture. In other words, dragging the virtual pointer from the start point to one of end points along the corresponding path is required in order to be defined as a valid user-input gesture. In some examples, a margin can be given according to a predefined or user defined tolerance, such that the user finger or the pointer can be allowed to deflect from the displayed path by the tolerance. Such that, the user-input movement that matches the predefined valid user-input gesture along one of the displayed paths is defined as a valid user-input gesture as long as the user-input movement follows one of the displayed paths and not exceeding the given margin.

Referring to FIG. 3, the unlocking procedure is similar to the password setting/resetting procedure. Specifically, in the unlocking procedure, steps S11, and S12 are similar to steps S1 and S2 in the setting/resetting procedure, respectively.

In step S13, when the user-input movement is validated as a valid user-input gesture, the flow proceeds to step S14. Otherwise, the flow proceeds to step S19, where an error message is displayed on display 2, and the method is terminated. In some examples, the method can be immediately terminated. As a result, unintentional activation of the method will not lead to inadvertent unlocking of the electronic device.

In step S14, the processing unit 4 is operable to determine one of pre-stored codes that corresponds to the valid user-input gesture. The determined code can be stored in a cache register (not shown) for later use.

In step S15, when a cancel condition (e.g., a "cancel" instruction in the unlocking procedure) occurs, the method is terminated. In other words, an incomplete authentication password input does not unlock the electronic device. Otherwise, the flow proceeds to step S16.

In step S16, the processing unit 4 is operable to determine whether a last one of the series of the user-input movements corresponding to the stored authentication password is inputted, i.e., whether a confirm condition occurs, and/or whether the number/quantity of the codes that are determined corresponding to the valid user-input movement matches the number/quantity of the codes of the stored authentication password. If so, the flow proceeds to step S17 for composing an authentication password by collecting the codes determined in step S14. Otherwise, the flow goes back to step S12 to continue detecting another user-input movement of a contact point at the display 2. In other embodiments, occurrence of the confirm condition is determined when the receiving unit 3 receives a confirm instruction, or when a predetermined time has elapsed after a last user-input movement is detected.

In step S18, the processing unit 4 is operable to determine whether the authentication password thus composed conforms with the stored authentication password. If so, the processing unit 4 unlocks the electronic device. Otherwise, the flow goes to step S19, and electronic device stays locked.

In another aspect, a different definition of a valid user-input gesture can be applied. For example, the valid user-input gesture may include moving the user finger and/or the pointer from the start point along one of the displayed paths to a corresponding one of the end points and then returning the pointer back to the start point through the one of the displayed paths.

In yet another aspect, another different definition of a valid user-input gesture can be applied. For instance, the valid user-input gesture may include moving the user finger or the pointer from the start point along one of the displayed paths to a corresponding one of the end points and keeping the pointer at the corresponding one of the end points for a holding time. Note that when the method is implemented for setting/resetting the authentication password, the holding time is arbitrary according to user preference.

Figure 5:
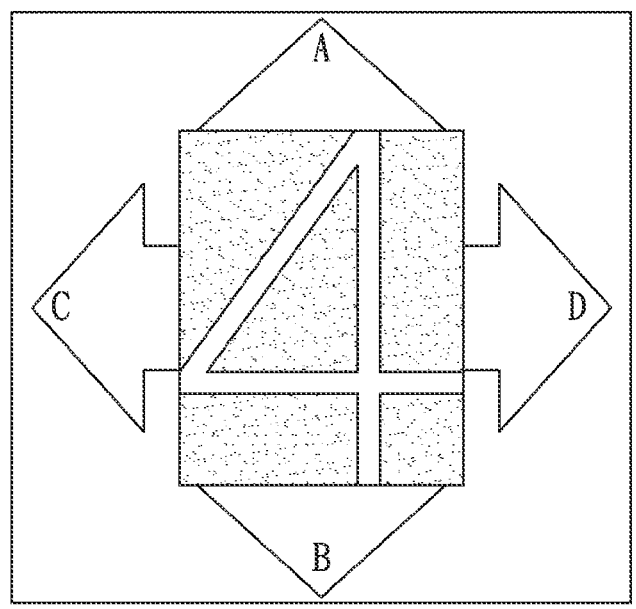
FIG. 5 is a schematic view illustrating another exemplary password input interface displayed by the password composing system, in which a notice is displayed during a holding time.
Figure 6:
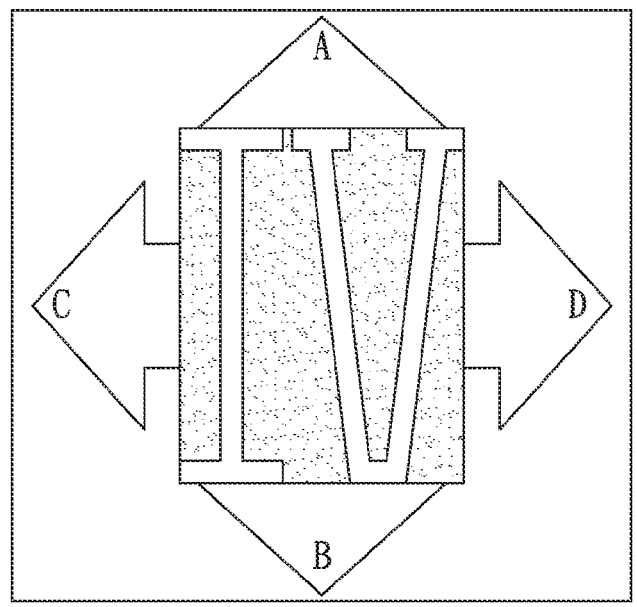
FIGS. 6 and 7 are schematic views illustrating the exemplary password input interface as FIG. 5, where different forms of the notice are presented.
Figure 7:
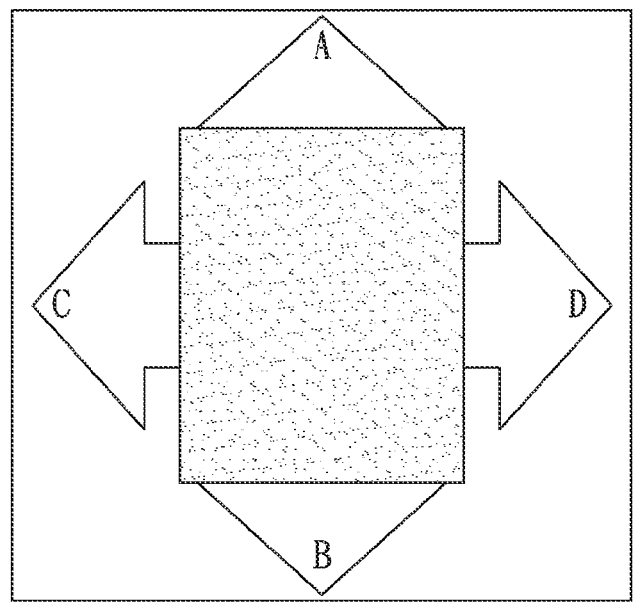

Referring to FIG. 5, in this case, during the holding time, the display 2 may also be operable to sequentially display a series of notices, such as a series of numbers indicating the holding time in seconds. In this case, the number displayed on the display 2 is incremented for every second during the holding time. In some examples, the series of notices may also include one of a series of specific character symbols (FIG. 6) and a series of specific colors (FIG. 7), being sequentially displayed in a specific order. Namely, the character symbols and/or the specific colors are presented on the password input interface in the specific order during the holding time.

In turn, the code stored by the processing unit 4 in this case further includes the information associated with a last one of the notices that is displayed at the end of the holding time. For example, assume a series of two user-input movements including a first movement, in which the user finger or the pointer is stayed at the end point (A) for one second, and a second movement, in which the user finger or the pointer is kept at the end point (B) for three seconds. In this case, the code for the first and second movements can be stored as (A1) and (B3), respectively.

When attempting to unlock the electronic device, the holding time must conform with the code stored during the setting/resetting procedure. That is, using the above example, a first movement must terminate at the end point (A) when the number "1" is displayed on the display 2, and a subsequent second movement must terminate at the end point (B) when the number "3" is displayed on the display 2.

To sum up, the embodiment of the present invention provides a relatively simple method that can offer an enhanced security over the conventional lock/unlock mechanism. The method of the present invention involves mostly simple motions, such that composing the authentication password can be relatively easy. Moreover, since the series of the user-input movements can vary among users, an unauthorized third party will not be able to access the electronic device easily since memorizing a combination of movements can be more difficult than memorizing a combination of numbers.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for composing an authentication password associated with an electronic device, said method to be implemented by a password composing system that is coupled to the electronic device and that includes a display, a receiving unit, and a processing unit, said method comprising the following steps of:
   (a) configuring the display of the password composing system to display a start point, and a plurality of displayed paths respectively extending from the start point toward different directions and terminating at respective end points;
   (b) configuring the receiving unit of the password composing system to detect a user-input movement of a contact point at the display, and configuring the processing unit of the password composing system to determine whether the user-input movement of the contact point conforms with a predefined valid user-input gesture, wherein the predefined valid user-input gesture includes a sliding motion along one of the displayed path from the start point to a corresponding one of the end points, moving the pointer from the start point along one of the displayed paths to a corresponding one of the end points, and holding the pointer at the corresponding one of the end points for a holding time;
   (c) when it is determined in step (b) that the user-input movement of the contact point conforms with the predefined valid user-input gesture, determining the user-input movement as a valid user-input gesture and determine a code that represents the valid user-input gesture, wherein the code is associated with the combination of the holding time and said one of the displayed paths along which the pointer moves; and
   (d) configuring the password composing system to repeat steps (b) and (c) to compose an authentication password by storing each code in order and put the stored codes together to form an authentication password.

2. The method of claim 1, wherein in step (b), the predefined valid user-input gesture includes moving a pointer from the start point along one of the displayed paths and stopping the movement of the pointer at a corresponding one of the end points, and in step (c), the code is associated with said one of the displayed paths, along which the pointer moves.

3. The method of claim 1, wherein in step (b), the predefined valid user-input gesture includes moving the pointer from the start point along one of the displayed paths to a corresponding one of the end points and then moving the pointer back to the start point along said one of the displayed paths, and in step (c), the code is associated with said one of the displayed paths, along which the pointer moves.

4. The method of claim 1, wherein in step (b), the display is configured to sequentially display a series of notices during the holding time, and in step (c), the code is further associated with the notice that is last displayed at the end of the holding time, the series of notices including at least one of a series of numbers, a series of character symbols and a series of specific colors.

5. The method of claim 1, the display and the receiving unit being implemented integrally in a touch screen, wherein in step (b), the user-input movement is executed by touching the touch screen.

6. The method of claim 1, the receiving unit being a pointing device including a press button, wherein in step (b), the user-input movement is triggered by pressing the press button.

7. The method of claim 1, wherein in step (d), the processing unit is configured to compose the authentication password after a stop condition occurs, the stop condition including one of:
receiving, by the receiving unit, a stop instruction; and
determining that a predetermined time has elapsed after detecting the user-input movement.

8. The method of claim 1, the electronic device being password-protected, wherein the authentication password composed in step (d) is used for unlocking the electronic device.

9. The method of claim 8, wherein in step (d), the processing unit is configured to compose the authentication password for unlocking the electronic device after a confirm condition occurs, the confirm condition including one of:
receiving, by the receiving unit, a confirm instruction; and
determining that a predetermined time has elapsed after detecting the user-input movement.

10. A password composing system to be coupled to an electronic device for composing an authentication password associated with the electronic device, said password composing system comprising:
a display for displaying a start point, and a plurality of displayed paths respectively extending from the start point toward different directions and terminating at respective end points;
a receiving unit that is for detecting a set of user-input movements of a contact point at said display; and
a processing unit coupled to said display and said receiving unit, and configured to
determine whether each of the user-input movements of the contact point conforms with a predefined valid user-input gesture that includes
a sliding motion along one of the displayed path from the start point to a corresponding one of the end points, moving the pointer from the start point along one of the displayed paths to a corresponding one of the end points, and holding the pointer at the corresponding one of the end points for a holding time;
store a plurality of codes corresponding to valid ones of the user-input movements that conforms with the predefined valid user-input gesture, respectively, wherein the code is associated with the holding time and said one of the displayed paths, along which the pointer moves; and
compose the authentication password by collecting the codes.

11. The password composing system of claim 10, wherein the predefined valid user-input gesture includes moving a pointer from the start point along one of the displayed paths and stopping the movement of the pointer at a corresponding one of the end points, and each stored code is associated with said one of the displayed paths, along which the pointer moves.

12. The password composing system of claim 10, wherein the predefined valid user-input gesture includes moving the pointer from the start point along one of the displayed paths to a corresponding one of the end points and then moving the pointer back to the start point along said one of the displayed paths, and each stored code is associated with said one of the displayed paths, along which the pointer moves.

13. The password composing system of claim 10, wherein said display is configured to sequentially display a series of notices during the holding time, and the code is further associated with the notice that is last displayed at the end of the holding time, the series of notices including at least one of a series of numbers, a series of character symbols and a series of specific colors.

14. The password composing system of claim 10, wherein said display and said receiving unit are implemented integrally in a touch screen, and the user-input movement is executed by touching the touch screen.

15. The password composing system of claim 10, wherein said receiving unit is a pointing device including a press button, and the user-input movement is triggered by pressing said press button.

16. The password composing system of claim 10, wherein said processing unit is configured to compose the authentication password after a stop condition occurs, the stop condition including one of:
receiving, by said receiving unit, a stop instruction; and
determining that a predetermined time has elapsed after detecting the user-input movement.

17. The password composing system of claim 10, the electronic device being password-protected, wherein the authentication password is used for unlocking the electronic device.

18. The password composing system of claim 17, wherein said processing unit is configured to compose the authentication password for unlocking the electronic device after a confirm condition occurs, the confirm condition including one of:
receiving, by said receiving unit, a confirm instruction; and
determining that a predetermined time has elapsed after detecting the user-input movement.

* * * * *